UNITED STATES PATENT OFFICE.

JACOB SLOAT, OF SLOATSBURG, NEW YORK.

IMPROVEMENT IN THE MANUFACTURE OF TWINE AND CORD.

Specification forming part of Letters Patent No. 1,405, dated November 9, 1839.

*To all whom it may concern:*

Be it known that I, JACOB SLOAT, of Sloatsburg, in the county of Rockland and State of New York, have invented a new and Improved Manufacture of Cotton Twine or Cord, by which improvement the liability of such twine to kink, stretch, and untwist is obviated, its durability is increased, and it is rendered equally applicable to various purposes with the twine prepared from more costly materials; and I do hereby declare that the following is a full and exact description thereof.

I make my twine of various sizes, and by means of the apparatus ordinarily used for that purpose, and I then subject it to the operation of dressing, employing for this purpose any of the dressing-machines used for dressing cotton yarn to prepare it for being woven on the loom, the operation being similar, excepting that the twine or cord, instead of being wound upon a yarn-beam is to be delivered so as to be wound into balls or otherwise put up for use. Various compositions of starch, gum, glue, or other materials possessing analogous properties may be used for dressing, the object being to saturate or coat the twine or cord with any suitable viscous substance, which shall have the effect of causing the fibers of cotton to adhere to each other, and consequently to prevent the kinking, stretching, and untwisting of the strands. I have found a mixture of starch and glue to answer the intended purpose perfectly well, and am not aware that any other material is to be preferred thereto, either for utility or economy.

I do not make claim to any new machinery to be used either in the process of spinning the twine or cord or for the purpose of applying the viscous dressing thereto; but What I do claim as my invention is—

The applying of the well-known process of dressing to cord or twine prepared from cotton in the ordinary way, whereby such cord or twine is greatly improved in its useful properties, and is thereby rendered an essentially new manufacture.

JACOB SLOAT.

Witnesses:
   THOS. P. JONES,
   GEORGE K. WEST.